May 13, 1930. J. R. JACKSON, JR 1,758,605
ELEVATOR
Filed Nov. 14, 1927 5 Sheets-Sheet 1

Fig.1

Inventor
Joseph R Jackson
Attorney

May 13, 1930.  J. R. JACKSON, JR  1,758,605
ELEVATOR
Filed Nov. 14, 1927   5 Sheets-Sheet 2

Fig.12

Patented May 13, 1930

1,758,605

UNITED STATES PATENT OFFICE

JOSEPH R. JACKSON, JR., OF BOSTON, MASSACHUSETTS

ELEVATOR

Application filed November 14, 1927. Serial No. 233,119.

The invention to be hereinafter described relates to elevators, and more particularly to electric elevators.

For most efficient and economical operation, it is highly desirable that the variations in the load on the car shall be recognized, and that regulation of the elevator machinery shall be accomplished in response thereto, in order that nearer approach may be had to the ideal of running the elevator car at a uniform speed under different loads, and bringing the car to rest at floor levels quickly and uniformly under different loads.

One of the purposes of the present invention, therefore, is to actually weigh the load on the car, and in the present instance, this is accomplished by a weighing machine at the base of the car having its platform serving as the floor of the car for supporting the car operator, passengers and other load. This weighing machine is utilized for control of various instrumentalities in the elevator operating mechanism.

The instrumentalities controlled by the weighing machine may be adjusted while the car is standing at a floor level, so as to be preset in readiness to furnish proper regulation of travel and arrest of the car. The weighing machine is automatically locked and cannot perform its weighing and control functions when the car gate is closed and the car is in motion.

In the present embodiment of the invention the speed of the car operating electric motor, the dynamic brake, and the mechanical brake are regulated in response to operation of the weighing machine.

The character of the invention may be best understood by reference to the following description of an embodiment thereof shown in the accompanying drawings, wherein:

Fig. 2 is a horizontal section through the base of the elevator car, parts being broken away to show the weighing machine suspension mechanism in the base;

Fig. 3 is a side elevation of the car base;

Fig. 4 is a vertical longitudinal section through the car base, and shows the gate actuated switch;

Fig. 4$^a$ is a detail of a portion of the car gate and a finger thereon; Fig. 4$^b$ is a detail of the gate actuated switch;

Fig. 5 is a transverse vertical section through the car base;

Figure 1:
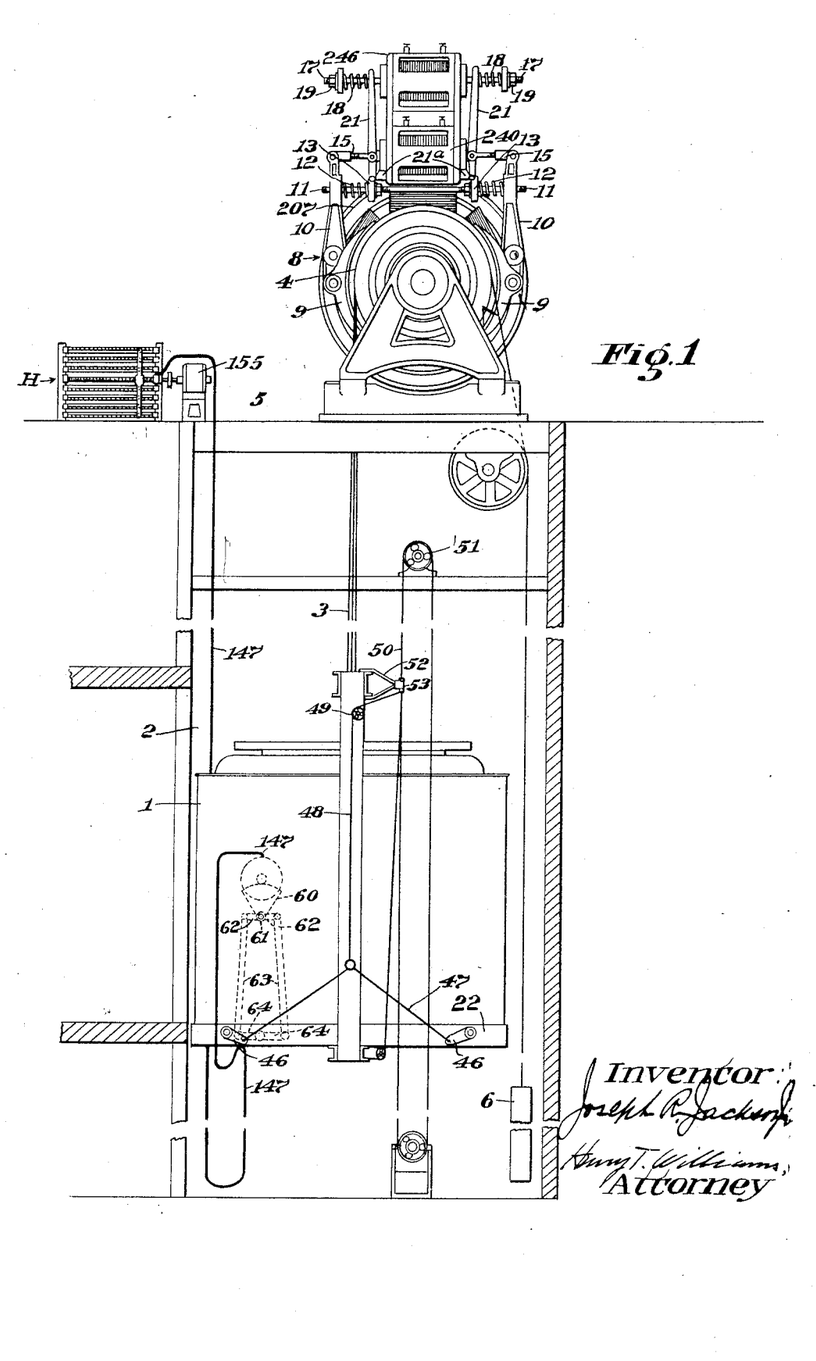
Fig. 1 is a vertical longitudinal section through an elevator system embodying the invention.

Referring to the drawings, the elevator system shown therein as embodying the invention, comprises the car 1 in the hatchway 2 and suspended by cables 3 which pass around the drum 4 in the penthouse 5, and said cables pass thence downward in the hatchway and are connected to the counterweight 6. The drum is driven by an electric motor 207 and is provided with a mechanical brake 8 comprising shoes 9 at the lower ends of levers 10. The upper ends of said levers have holes therein receiving a rod 11 carrying coil springs 12 confined between said levers and nuts 13 threaded onto the rod. The construction is such that the springs tend to apply the brake. To release the brake, an electromagnet 240 is provided. The cores of this magnet are connected by links 15 with the upper ends of the levers 10. The construction is such that on energization of the magnet, the levers will be rocked against the opposition of the springs and withdraw the shoes from the drum.

To vary the force of application of the mechanical brake, an electromagnet 246 is provided. Rods 17 are connected to the cores of this magnet and carry coil springs 18 which are confined between nuts 19 threaded on the rods and arms 21 which are pivotally connected to the links 15 referred to, and are fulcrumed on brackets 21$^a$ on the magnet 240.

The construction is such that on energization of the magnet 246, the arms 21 will be rocked toward each other and against the opposition of the brake springs 12, thereby to reduce the force in applying the brake.

The car has a base 22 (Figs. 2 to 5) containing a shallow chamber 23 in which is mounted a weighing machine comprising a platform 24 which serves as the car floor. Projecting down from the platform are wedge-shaped lugs 25 resting on similarly shaped seats 26 on yokes 27 and 28 of the weighing machine suspension. These yokes have ends pivotally mounted on bearings 29. The yoke 27 has an arm 30 overlying an arm 31 of the yoke 28, said arms being connected by a ring 32. A coil spring 33 is interposed between the bottom of the base and the arm of one of the yokes, tends to rock the yokes upwardly and is adapted to yield when a load is placed upon the platform. The arm 30 is longer than the arm 31, and has a seat 34 in the under side of the end thereof which is engaged by a finger 35 on a rock shaft 36 projecting out beyond one side of the car.

To prevent dirt from reaching and interfering with the weighing machine suspension mechanism, strips 24ª of rubber or other suitable material are fitted into opposed grooves in the base and in the edges of the platform. To assist in ventilating the car, the portion of the base surrounding the platform may have a series of ports 22ª extending therethrough and communicating with a hood 22ᵇ for deflecting the air downward. To prevent the platform from moving in the direction of the plane thereof, the under side of the platform may be provided with brackets 24ᵇ engaged by rollers 24ᶜ carried by adjustable pins 24ᵈ on the base. A pair of these rollers may be provided at each side of the base.

Figure 6:
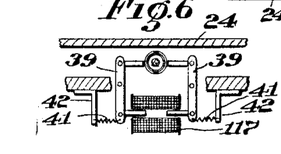
Fig. 6 is a sectional detail of the weighing machine locking mechanism.

To lock the weighing machine, the rock shaft 36 is provided with a cylindrical enlargement 37, and cooperating therewith are a pair of clamp shoes 38 carried by levers 39 (Fig. 6) pivotally mounted on the base intermediate their ends and connected to cores of an electromagnet 117 beneath the car base. Coil springs 41 are connected to said levers and to brackets 42. The construction is such that when the magnet is de-energized, the springs will apply the shoes thereby to lock the weighing mechanism, and when the magnet is energized, the shoes will be released.

In case the car attains abnormal speed, it is desirable that the weighing machine platform shall be supported independently of the suspension, thereby to protect the latter from injury. To accomplish this, cams 43 are provided on rock shafts 44 mounted in bearings 45 in the base. These shafts project out beyond a side of the car and have arms 46 connected thereto, said arms in turn being connected to a sling 47 (Figs. 1 and 3) which passes through an eye on a cable 48 which passes over a sheave 49 and is connected to the usual cable 50 which operates the usual governor 51 as the car travels in the hatchway. The cable 50 is detachably connected with a bracket 52 by a usual ball and socket device 53. When the car attains abnormal speed, the governor will pull the ball from the socket and cause the usual clamps on the car to grip the car guide rails and support the car. Before the clamps grip the rails the cable 48 will pull the sling upward, thereby rocking the shafts 44 so as to bring the cams 43 in position to support the weighing machine platform independently of the suspension.

Figures 7, 10:
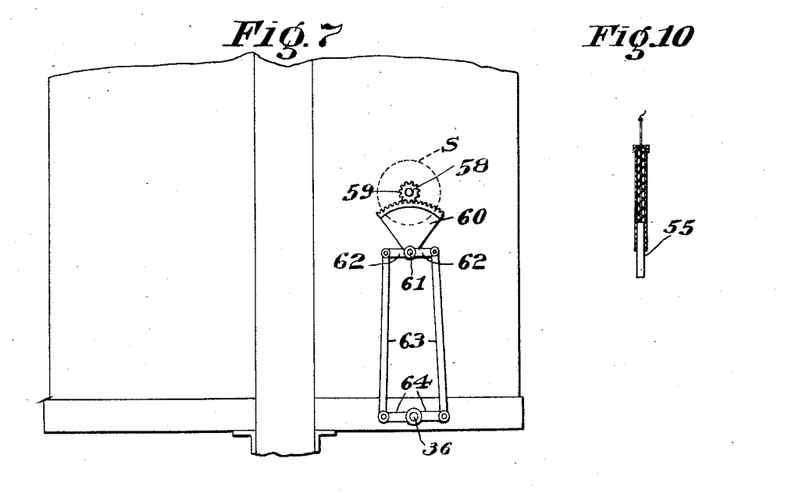
Fig. 7 is a view of a portion of the car and the means for transmitting motion from the weighing machine to the selector.
Fig. 10 on an enlarged scale is a sectional detail of one of the selector brushes.
Figure 8:
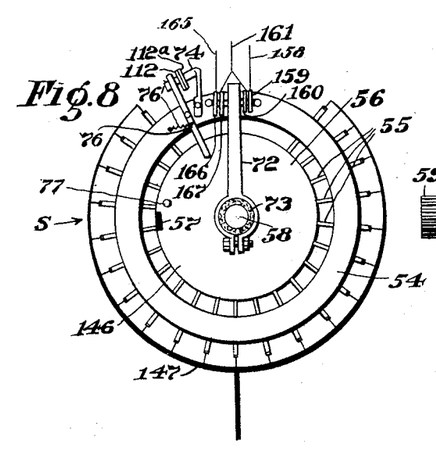
Fig. 8 is a front elevation of the selector.
Figure 9:
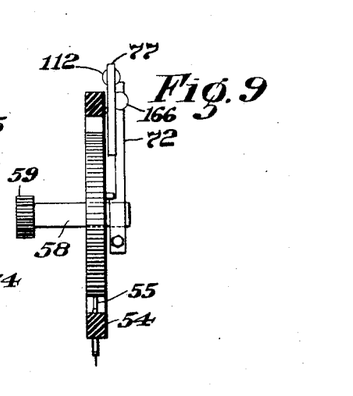
Fig. 9 is a view partly in section and partly in elevation of the selector ring and rotor.
Figure 11:
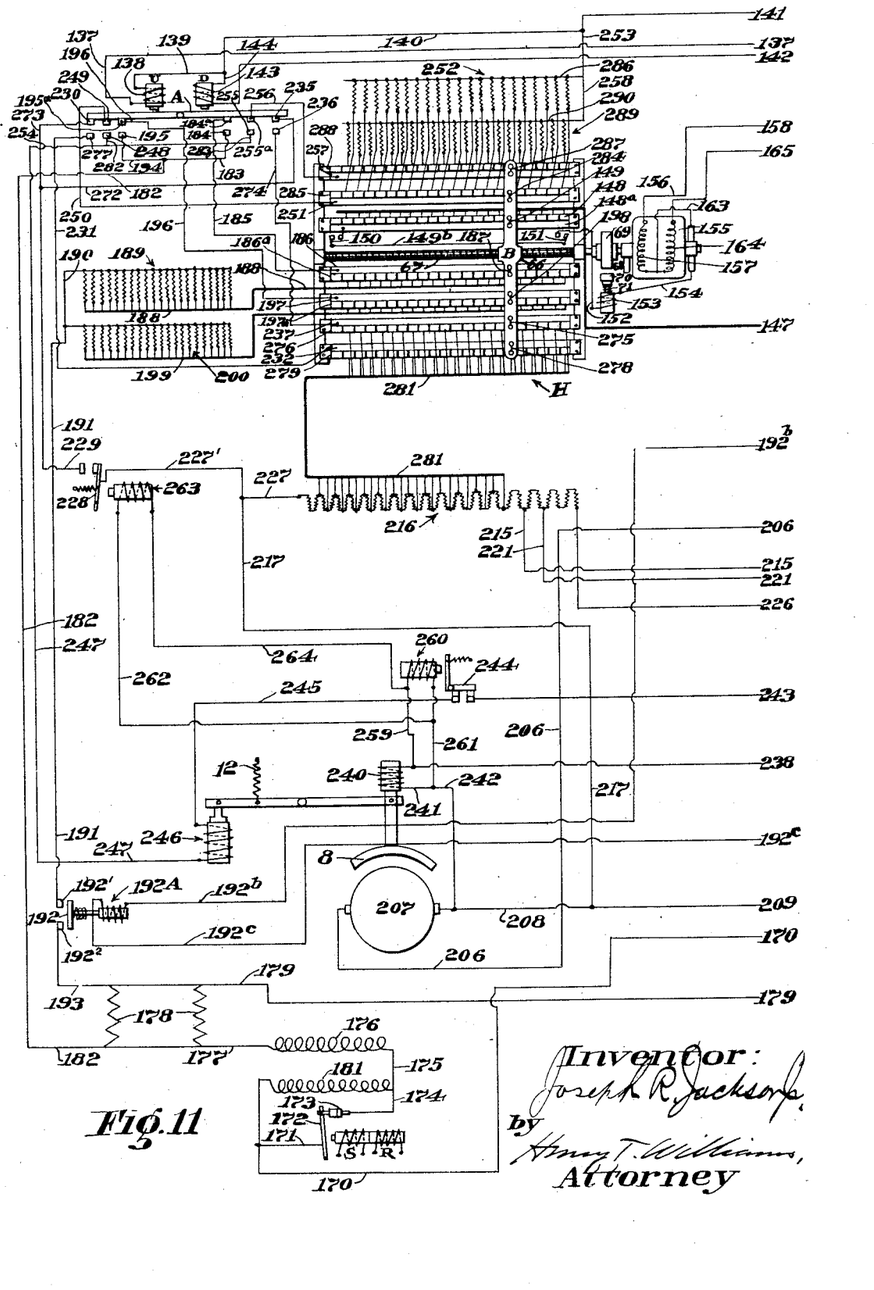
Figs. 11 and 12 show the wiring diagram of the elevator system.
Figure 12:
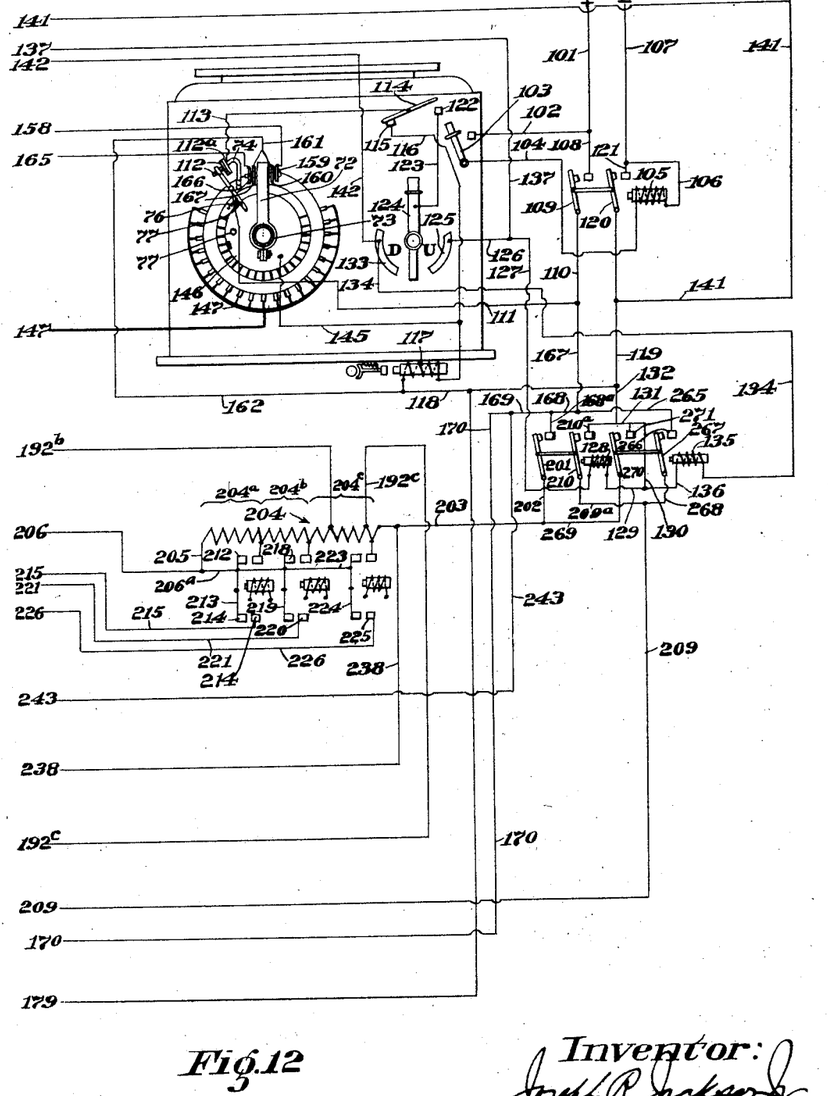

The weighing machine will operate in response to the load on the platform to rock the shaft 36 referred to, and the motion thus produced may be utilized for regulating various instrumentalities of the elevator system. Said machine operates a selector S on the car comprising a stationary ring 54 (Figs. 8 and 9) of insulation material and carrying a series of spring-pressed brushes 55 (Fig. 10). Within the ring and engaging the brushes is a disk or rotor 56 of conductive material with the exception of an insulation spot 57. This rotor is on a shaft 58 carrying a pinion 59 which meshes with a toothed sector 60 on a stud shaft 61. Connected to the stud shaft are a pair of arms 62 connected by links 63 to arms 64 on the rock shaft 36 referred to. The construction is such that when a load is placed on the platform, the rotor will be turned and cause the insulation spot thereof to move to a position at the end of a selected brush 55.

The selector controls a resistance varying or positioning machine H comprising rows of stationary contacts, and bridge contacts on a carrier B having a nut 66 threaded on a screw shaft 67 rotated by an electric motor 155. A brake 68 is provided for this screw shaft, and comprises a drum 69 on the shaft, and a shoe 70 which is applied by a coil spring 71 and is released by an electromagnet 153.

An arm 72 has a hub on an insulation sleeve 73 on the rotor shaft, and carries a pair of contacts 160 and 167 respectively for engagement with fixed contacts 159 and 166. The rotor will be turned by the weighing machine in a lockwise or contra-clockwise direction depending on whether the load on the platform increases or decreases. The arm hub has sufficient frictional engagement with the insulation sleeve and the rotor shaft, so that on initial turning of the rotor, the arm will be moved in the direction of the turning of the rotor and thereby cause one of the contacts on the arm to engage one of the fixed contacts, but this will not interfere with continued turning of the rotor. These contacts controlled by the arm are in circuits to be described, for the positioning machine motor and control the direction of rotation of said motor and the direction of travel of the bridge contact carrier.

The contact 112ª is carried by a bracket 74 on the selector ring, and the contact 112 is carried by a lever 76 pivotally mounted on the ring. A coil spring 76' has one end connected to the ring and the other end connected to the lever, and tends to hold the contact 112 in engagement with the contact 112ª. A pin 77 on the rotor is adapted to engage the lever and move the contact 112 out of engagement with the contact 112ª when a load is on the platform heavier than the maximum load the car is intended to carry. This will break the circuit for the position machine motor and arrest the motor which will not be started again until the load on the platform is reduced within the maximum load it is intended to carry. When the load is so reduced, the pin 77 on the rotor will move away from the lever 76 and allow the spring 76' to rock the lever and move contact 112 into engagement with contact 112ª.

The circuit for rotating the position machine motor in one diretcion is traced through the main line 101, wire 108, switch 109, wires 110 and 111, contacts 112 and 112ª at the selector, wire 113, switch 114 controlled by the gate of the car, contact 115, wires 116 and 145, selector rotor and all of the brushes of the selector ring excepting the one engaging the rotor insulation spot. The circuit is traced thence through wires in cable 147 to the row of contacts 148 of the position machine, bridge contact 149 on carrier B, bar 148ª, limit switch 150, wire 149ᵇ, limit switch 151, wire 152, position machine brake coil 153, wire 154 to one of the brushes of position machine motor 155 through its commutator and other brush, wire 163, field coil 157, wire 156, wire 158, contacts 159 and 160 at selector, wires 161, 162, 118 and 119, switch 120, contact 121, and main line 107.

The circuit for rotating the position machine motor in the opposite direction is traced through main line 101, wire 108, switch 109, wires 110 and 111, contacts 112 and 112ª at selector, wire 113, car gate control switch 114, contact 115, wires 116 and 145, to selector rotor. The circuit is traced thence through all of the selector ring carried brushes excepting the one engaging the insulation spot through wires in cable 147 to row of contacts 148 through bridge contact 149 on carrier B, bar 148ª, limit switch 150, wire 149ᵇ, limit switch 151, wire 152, brake magnet coil 153, wire 154, one of the brushes of motor 155 through its commutator and the other brush, wire 163 to field coil 164, wire 165, contacts 166 and 167 at selector, wires 161, 162 and 119, switch 120, contact 121, and main line 107.

The field coils 157 and 164 of the motor 155 are wound in opposite directions, and therefore, when the circuit including one of these coils is completed, the motor will be rotated in one direction, and when the circuit including the other coil is completed, the motor will be rotated in the opposite direction.

Since the position machine motor and the coil of the magnet for releasing the brake for the motor driven shaft are in series, when the motor circuit is broken the brake magnet will be de-energized and the spring of the brake will apply the latter promptly to arrest the motor shaft and the bridge contact carrier B.

The wires conducting the current to the position machine motor will cause the motor to rotate until the bridge contact carrier arrives at the contact of the row of contacts 148ª connected by the wire in cable 147 which leads to the selector brush opposite the insulation spot of the rotor. When the bridge contact reaches this contact which does not carry current, the motor will be arrested and promptly brought to a stop by the brake.

When the car gate is open, the switch 114 is held in engagement with the contact 115 by the coil spring 114ᵇ. When the car gate is closed, the switch 114 is moved out of engagement with the contact 115, thereby breaking the circuit to the position machine motor and preventing operation of said motor at all times excepting when the gate is open. The selector is pre-set in response to the load on the platform prior to closing the gate and starting of the car.

Mounted in the car is the usual emergency or safety switch 103 which when closed completes the circuit traced through main line 101, wire 102, switch 103, wire 104, magnet 105, wire 106, and main line 107. The magnet 105 when energized by completing this circuit, closes the main line switches 109 and 120, and the elevator system is now in readiness for operation.

The circuit for the elevator motor field is traced through main line 101, wire 108, switch 109, wires 110, 167, 168, 169, 170 and 171, the usual master magnet switch 172, contact 173, wires 174 and 175, field coil 176, wire 177, resistance bank 178, wires 179 and 119, switch 120, contact 121, and main line 107.

In starting and stopping the elevator motor, the field coil 181 is cut out by the master switch 172. After the motor attains normal speed, the master switch is opened and the current passes through the field coils 181 and 176 in series.

The armature circuit for the elevator motor 207 for uptravel of the car is traced through main line 101, wire 108, switch 109, wires 110, 167, 168, 168ª, switch 201, wires 202 and 203, starting resistance 204, wires 205 and 206 to one of the brushes of the motor 207. The circuit continues from the other brush through wires 208, 209 and 209ª, switch 210, wires 132 and 119, switch 120, contact 121, and main line 107. The armature circuit for down-travel of the car is traced through main line 101, wire 108, switch 109, wires 110, 167 and 265, contact 266, switch 267, wires 268, 209 and 208 to one of the brushes of the motor. The circuit continues from the other brush through wires 206 and 205, resistance 204, wires 203 and 269, switch 270, contact 271, wires 131, 132 and 119, switch 120, contact 121, and main line 107.

The circuit for energizing the magnet 128 to close the up-travel switches 201 and 210 in the elevator motor circuit, is traced through main line 101, wire 108, switch 109, wires 110 and 111, contacts 112 and 112$^a$ at selector, wire 113, gate controlled switch 114, contact 122, wire 123, hand lever 124 in the car, contact segment 125, wires 126 and 127, magnet 128, wires 129, 130, 131, 132 and 119, switch 120, contact 121, and main line 107.

The circuit for energizing the magnet 135 to close the down-travel switches 267 and 270 in the elevator motor circuit, is traced through main line 101, wire 108, switch 109, wires 110 and 111, contacts 112 and 112$^a$ at selector, wire 113, switch 114, contact 122, wire 123, hand lever 124, contact segment 133, wire 134, magnet 135, wires 136, 130, 131, 132 and 119, switch 120, contact 121, and main line 107.

Thus, it will be seen that by shifting the hand lever in the car into engagement with contact segment 125, the up switches 201 and 210 will be closed to establish the circuit for causing the elevator motor to be driven in a direction for up travel of the car and when the hand lever is shifted into engagement with the contact segment 133, the down switches 270 and 267 will be closed to establish the elevator motor circuit for down travel of the car.

The starting or accelerating resistance 204 is varied through switches which are operated in sequence to reduce the resistance in the elevator motor circuit in stages. When the motor is up to normal speed, all of this resistance is cut out. The dynamic resistance 216 is shunted across the armature, and a portion of this dynamic resistance is utilized to by-pass a portion of the current to the motor in starting. Otherwise it would be necessary to employ a line resistance larger than the resistance 204. In starting the motor the full line resistance 204 is in force, and therefore, the current to the armature is reduced. By increasing the dynamic resistances, a greater amount of the current is sent through the armature. When the line resistance is cut out and full current is on the motor, the dynamic resistance is cut out and has no effect.

At the time of starting the elevator motor, the switch 213 does not engage contact 212 and engages contact 214, the switch 219 does not engage contact 218 and engages contact 220, and the switch 224 does not engage contact 223 and engages contact 225. The circuit including the dynamic resistance is traced from the line resistance 204 through wire 206$^a$, switch 213, contact 214, wire 215, dynamic resistance 216, wires 227 and 217 to wire 209.

To cut out the first stage 204$^a$ of the line resistance, the switch 213 is moved by its usual magnet into engagement with the contact 212. As the portion 204$^a$ of the line resistance is cut out, the switch 213 disengages contact 214 and an additional resistance is brought into the dynamic resistance, and the circuit therefor is traced through wire 206$^a$, switch 219, contact 220, wire 221, resistance 216, and wires 227 and 217 to wire 209.

To cut out the second stage 204$^b$ of the line resistance, switch 219 is moved by its usual magnet into engagement with the contact 218. As the portion 204$^b$ of the line resistance is cut out, switch 219 disengages contact 220 and an additional resistance is brought into the dynamic resistance and is traced by a circuit through wire 206$^a$, switch 224, contact 225, wire 226, dynamic resistance 216, and wires 227 and 217, to wire 209.

To cut out the last stage 204$^c$ of the line resistance, switch 224 is moved by the usual magnet into engagement with contact 223. Now the circuit is completed to the armature with the entire line resistance eliminated, and since switch 224 is moved out of engagement with the contact 225, the circuit to the dynamic resistance is broken.

The circuit for energizing the brake release magnet 240 for up-travel of the car is traced through main line 101, wire 108, switch 109, wires 110, 167, 168 and 168$^a$, switch 201, wires 202, 203 and 238, magnet 240, wires 241, 242, 208 and 209, switch 210, wires 132 and 119, switch 120, and main line 107.

The circuit for the brake releasing magnet 240 for down-travel of the car is traced through main line 101, wire 108, switch 109, wires 110, 167, and 265, contact 266, switch 267, wires 268, 209, 208 and 242, magnet 240, wires 238 and 203, wire 269, switch 270, contact 271, wires 131, 132, and 119, switch 120, wire 121 and main line 107.

Since the brake release magnet takes its current through the up switches 201 and 210 and the down switches 267 and 270, and operation of these switches is controlled by the hand lever 124 in the car, it follows that when said hand lever is moved out of engagement with the contact segments 125 and 133, the up and down switches will be open and the circuits to the brake releasing magnet 240 will be interrupted, and the springs 12 will become effective to apply the brake. On the other hand, in starting, either the up or down switches will be closed and a circuit will be completed to said magnet for releasing the brake.

The circuit for the magnet 246 which opposes application of the brake 240 for up-travel of the car, is traced through main line 101, wire 108, switch 109, wires 110, 167, 168, 169 and 243, switch 244 at relay 260, wire 245, magnet 246, wires 247, 254 and 282, contacts 248 and 249, wire 250, position machine bar 251, bridge contact 284 on carrier B, row of contacts 285, resistances 252, bar 286, wires 253 and 141, switch 120, wire 121 and main line 107.

The circuit for the magnet 246 which opposes application of the brake 240 for down-travel of the car, is traced through main line 101, wire 108, switch 109, wires 110, 167, 169 and 243, switch 244 at relay 260, wire 245, magnet 246, wires 247, 254 and 283, contacts 255 and 255$^a$, wire 256, position machine bar 257, bridge contact 287 on carrier B, row of contacts 288, resistances 289, bar 290, wires 258, 253 and 141, switch 120, contact 121, and main line 107.

Under the control of the weighing machine and the selector, the position machine carrier B will set the bridge contacts in the up and down travel circuits described, so that the magnet 246 will have a force in opposition to the mechanical application of the brake which is in proportion to the load on the car.

The circuit for the magnet 246 for opposing application of the brake, should be interrupted on release of the brake on energization of the magnet 240. Accordingly relay 260 is shunted across the brake release magnet 240 in a circuit traced through wire 259 leading from wire 238 through magnet of relay 260, and wire 261 to wire 242.

Having described the mechanical brake and the means for varying its force of application in proportion to the load on the car, next will be described the means for varying the dynamic brake effect in proportion to the load on the car. This is accomplished by variation in the dynamic resistance 216 under the control of the selector.

The circuit for this control for up-travel of the car, is traced from resistance 216 through wires 227 and 227', relay switch 228 at relay 263, wires 229 and 273, contacts 235 and 236, wire 274, position machine bar 237, bridge contact 275 on carrier B, row of contacts 276, and the wires in cable 281 leading from said contacts to points in the resistance 216.

The circuit for this control for down-travel of the car, is traced from resistance 216 through wires 227 and 227', switch 228 at relay 263, wires 229 and 273, contacts 230 and 277, wire 231, position machine bar 232, bridge contact 278 on carrier B, row of contacts 279, and wires in cable 281 leading from said contacts to points in the resistance 216.

In each of the two circuits described above for the selector position machine control of the dynamic resistance, one contact of the position machine is active in the circuit at a time, and the resistance thus selected will be in proportion to the load in the car.

The selector position machine control of the dynamic resistance should be inoperative at all times excepting when the car is approaching its stop. To accomplish this, the switch 228 is provided in circuits under control of the relay 263 which is energized to open the switch 228 when the circuit is completed to the magnet 240 for releasing the brake. This relay circuit is traced through wires 259 and 264, coil of relay magnet 263, and wires 262 and 261 to wire 242. When the magnet 240 is de-energized to allow the springs 12 to apply the brake, the relay magnet will be de-energized, and the switch 228 will be automatically closed.

In ordinary electric elevator systems there is no provision to compensate for variations in the speed of the elevator motor due to variation in the load on the car. This is accomplished in the present system by sets of resistances in the motor field circuit under the control of the selector and position machine which are pre-set in response to variations in the load on the car.

The circuit for the selector and position machine control resistances in the field circuit for up-travel of the car is traced through wire 182 leading from the field coils of the elevator motor through wire 183, contact 184, insulated contact 184$^a$ carried by lever A, wire 185, position machine bar 186, bridge contact 187 on carrier B, row of contacts 186$^a$, wires in cable 188 leading from said contacts to the resistance bank 189, wires 190 and 191, contacts 192' and 192$^2$ bridged by switch 192 at relay 192A, and wire 193 to resistance bank 178.

The circuit for the selector and position machine control resistances in the field circuit for down-travel of the car, is traced through wire 182 leading from the field coils of the elevator motor, through wire 194, contact 195, contact 195$^a$ on lever A, wire 196, position machine bar 197, bridge contact 198 on carrier B, row of contacts 197$^a$, wires in cable 199 leading from said contacts to resistance bank 200, wire 191, contacts 192' and 192$^2$ bridged by switch 192 at relay 192A, and wire 193 to resistance bank 178. Thus, resistances are provided in shunt circuits across the elevator motor feel coils and including resistances which may be selected to regulate the speed of the motor in response to variations in the load on the car.

These shunt circuits should be interrupted if the field circuit is broken, so that the fixed or standard resistance 178 shall remain unchanged until the motor attains normal speed. To accomplish this, the switch 192 is provided under the control of the relay 192A, which is in a circuit including the wire 192$^b$ connected into an intermediate point in the resistance 204 through a small portion of this resistance and the wire 192$^c$ back to the relay. When the car starts and current is passing through the resistance 204, a small portion of the current will pass through the relay 192A and open the switch 192 to interrupt the shunt circuits. As the last stage of acceleration of the motor is made, the starting resistance is entirely cut out, with the result that the current to relay 192A is interrupted, and the switch 192 is closed, thereby establishing the shunt circuits containing the resistances which are now available to vary the standard or fixed resistances 178 and regulate the speed of the motor.

When the elevator motor circuit is set for up or down travel of the car, the selector controlled resistance circuits should also be set for up and down travel. Assuming the hand lever 124 in the car to be thrown into engagement with the contact 125 for up-travel, the circuit is traced through contact segment 125, wires 126 and 137, magnet 138 at switch A, wires 139, 140 and 141, switch 120, contact 121 and main line 107. This will energize the magnet 138 and rock the lever A so as to complete the position machine circuits for resistances to be brought into play for variation of the car speed, the dynamic brake effect and the opposition to the mechanical brake for up-travel of the car.

Assuming the hand lever 124 in the car to be thrown into engagement with contact segment 133 for down-travel of the car, the circuit is traced through contact segment 133, wire 142, magnet 145 at switch A, wires 144, 140 and 141, switch 120, contact 121, and main line 107. This will energize the magnet 143 and rock the switch A into a position to complete the circuits for the selector control resistances in varying the speed of the car, the dynamic brake effect, and the opposition to application of the brake for down-travel of the car.

Figures 2, 3, 4, 4A, 4B:
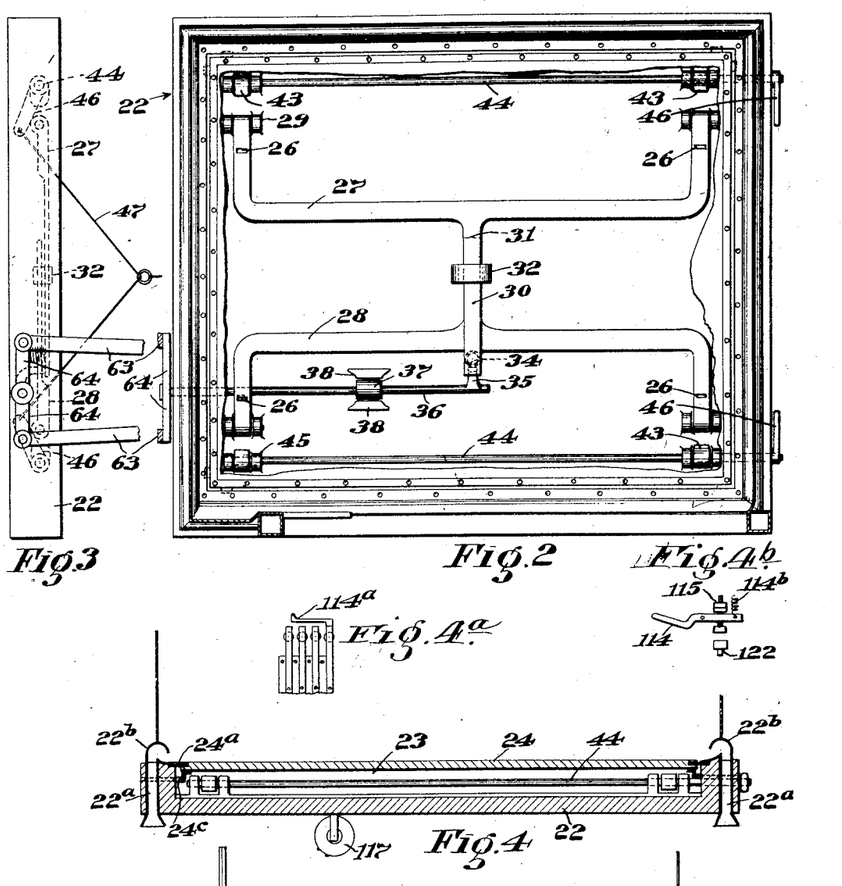

As stated, means is provided for locking the weighing machine on closure of the car gate and for releasing the locking means on opening of the gate. This means includes an electromagnet in a circuit traced through wires 101 and 108, switch 109, wires 110 and 111, contacts 112 and 112ª at selector, wire 113, switch 114 (Fig. 4ᵇ), contact 115, wire 116 to coil of magnet 117, wires 118 and 119, switch 120, contact 121 and main line 107. A finger 114ª (Fig. 4ª) on the gate cooperates with the switch 114 so that when the gate is open, the switch 114 will be urged by the spring 114ᵇ into engagement with the contact 115, thereby completing the circuit to the magnet 117 to release the locking means for the weighing machine. When the gate is closed, the finger 114ª will rock the lever 114 causing it to engage the contact 122 and to interrupt the circuit to the magnet 117, thereby rendering the locking means effective to lock the weighing machine.

In operation, it may be assumed that the elevator car is standing at a floor level, and that the gate of the car is open in order that the car may receive passengers or other load. The weighing machine is now unlocked, and its platform will be moved downward somewhat, thereby turning the selector rotor to a position corresponding to the load. The selector in turn will control the operation of the position machine motor and cause the latter to move the bridge contact carrier B to a certain position, selecting the resistances in the circuits for properly regulating the speed of the car, the force of application of the dynamic brake and the force of application of the mechanical brake. The selector and the position machine carrier are pre-set in proper positions before travel of the car commences. Closure of the car gate will cause the weighing machine to be locked, so that there can be no departure from this setting until the car reaches a stop. If the load on the car is beyond its normal capacity, the selector rotor will have rotated to a position to break the circuits for the position machine motor and the car driving motor.

It will be understood that the invention is not limited to the specific embodiment shown, and that various deviations may be made therefrom without departing from the spirit and scope of the appended claims.

What is claimed is:—

1. In an elevator, the combination of a car, and a weighing machine having a platform serving as the car floor, and a double yoke suspension for the platform.

2. In an elevator, the combination of a car, a weighing machine on the car, a rock shaft for receiving motion from the weighing machine, a toothed segment, a pinion meshing with the segment, and means for imparting rocking motion from the rock shaft to the segment.

3. In an elevator, the combination of a car, a weighing machine on the car, a rock shaft for receiving motion from the weighing machine, a gear, and a parallel link device for imparting motion from the rock shaft to the gear.

4. In an elevator, the combination of a car having a gate, a weighing machine on the car for weighing the load thereon, and means for automatically preventing operation of the weighing machine when the gate is closed.

5. In an elevator, the combination of a car having a gate, a weighing machine on the car having a platform for supporting the load on the car, and electrically controlled means for preventing operation of the weighing machine when the gate is closed.

6. In an elevator, the combination of a car having a gate, a weighing machine on the car having a platform for supporting the load on the car, and means for preventing operation of the weighing machine when the gate is closed, said means including an electric circuit having a switch controlled by opening and closing of the gate.

7. In an elevator, the combination of a car having a gate, a weighing machine on the car having a platform for supporting the load on the car, and suspension means for the platform, holding means for locking the suspension means, and means for preventing said holding means from locking the suspension means when the gate is open and rendering the holding means effective to lock the suspension means when the gate is closed.

8. In an elevator, the combination of a car, a weighing machine on the car having a platform for receiving the car load, suspension means for the platform, means for supporting the platform independently of the suspension means, and means for rendering the supporting means effective when the car attains abnormal speed.

9. In an elevator, the combination of a car, a weighing machine on the car having a platform for supporting the car load, suspension means for the platform, members beneath the platform normally out of engagement therewith, and means for automatically moving the members into position for supporting the platform when the car attains abnormal speed.

10. In an elevator, the combination of a car having a frame at the base thereof, a weighing machine in the base having a platform spaced from the frame, and a flexible strip bridging the space between the platform and frame.

11. In an elevator, the combination of a car having a frame at the base thereof, a weighing machine in the base having a platform spaced from the frame, a flexible strip bridging the space between the platform and frame, and means to secure the strip to the platform and frame.

12. In an elevator, the combination of a car, a weighing machine on the car having a platform for receiving the car load, a drum for the car supporting cables, a brake for the drum, an electromagnet for releasing the brake, an electromagnet for varying the force of the brake, a circuit for the latter magnet including a resistance, and means operable in response to the weighing machine for varying the effective resistance.

13. In an elevator, the combination of a car, means on the car for weighing the car load, a drum for the car supporting cables, a brake for the drum, mechanical means for applying the brake, electromagnetic means for releasing the brake, and electromagnetic means opposing the mechanical brake applying means with a force varying under the control of the weighing means.

14. In an elevator, the combination of a car, means on the car for weighing the car load, a drum for the car supporting cables, a brake for the drum, electromagnetic means for releasing the brake, electromagnetic means for controlling the force of application of the brake, a circuit for the latter electromagnetic means including a variable resistance, and selector means operable in response to the weighing means for rendering effective a selected resistance to control the force of the brake proportionately to the load on the car.

15. In an elevator, the combination of a car, a weighing machine on the car for receiving the car load, a drum for the car supporting cables, a brake for the drum, and means for regulating the force of the brake proportionately to the load on the car including an electromagnet, a circuit for the magnet having a series of resistances, and means for selecting any one of said resistances including an electric motor, a screw shaft rotated by the motor, a follower threaded on the screw shaft having a contact movable along the resistances, and means operated by the weighing machine for controlling operation of the motor.

16. In an elevator, the combination of a car, a weighing machine on the car for receiving the car load, a drum for the car supporting cables, a brake for the drum, and means for regulating the force of the brake proportionately to the load on the car including an electromagnet, a circuit for the magnet having a series of resistances, and means for rendering effective any one of said resistances including an electric motor, a screw shaft rotated by the motor, a follower threaded on the screw shaft having a contact movable along the resistances, a circuit for the motor including a selector having a series of contacts corresponding to the series of resistances, and a conductor member engaged by said contacts and having an insulation element adapted to engage said contacts, said weighing machine being adapted to set said member with its insulation element in engagement with any one of said contacts.

17. In an elevator, the combination of a car, means on the car for weighing the car load, a selector comprising a support, a series of brushes on the support, a member engaged by said brushes having conducting and insulation portions, and means to impart motion to said member from the weighing machine, thereby to set said member in a position with its insulation portion in engagement with one of said brushes.

18. In an elevator, the combination of a car, means on the car for weighing the car load, a selector comprising a ring, a series of brushes on the ring, a rotor having conducting and insulation portions engaged by said brushes, means operated by the weighing machine to turn the rotor and set the same in a position determined by the weight of the load, and means controlled by the selector for regulating an operation of the elevator.

19. In an elevator, the combination of a car having means for weighing the load on the car, driving means for causing the car to travel in the elevator hatchway, means adapted to be set in positions predetermined by operation of the weighing means while the car is standing at a level for regulating arrest of the car at another level, and means for locking the weighing means to prevent loss of the setting of the regulating means.

20. In an elevator, the combination of a car having means for weighing the load on the car, driving means for causing the car to travel in the elevator hatchway, and means for pre-regulating arrest of the car at floor levels including a selector pre-set in positions determined by operation of the weighing means while the car is standing at a level, and means for preventing setting of the selector while the car is travelling.

21. In an elevator, the combination of a car, means for causing the car to travel in the elevator hatchway, means for arresting the car at floor levels including a brake, spring means for applying the brake, an electromagnet for releasing the brake, an electromagnet for varying the braking effect of the spring means, and means responsive to variations in the load in the car for regulating the force of the second magnet proportionally to the car load.

22. In an elevator, the combination of a car, means for arresting the car at floor levels including a dynamic brake, means on the car for weighing the car load, and means responsive to operation of the weighing means for varying the force of the dynamic brake.

23. In an elevator, the combination of a car, an electric motor for causing the car to travel in the elevator hatchway, means on the car for weighing the car load, and means responsive to operation of the weighing means for regulating the speed of the motor.

24. In an elevator, the combination of a car, an electric motor for causing the car to travel in the elevator hatchway, means on the car for weighing the car load, a circuit including a resistance shunted across the motor field, and means responsive to operation of the weighing means for varying said resistance to regulate the speed of the motor.

25. In an elevator, the combination of a car, an electric motor for causing the car to travel in the elevator hatchway, a brake for said motor, means for weighing the car load, means operable in response to said weighing means for varying the force of application of the brake, and means operable in response to said weighing means for regulating the speed of the motor.

26. In an elevator, the combination of a car, an electric motor for causing the car to travel in the elevator hatchway, a dynamic brake for said motor, a mechanical brake for said motor, means for weighing the load on the car, and means controlled by said weighing means for varying the dynamic and mechanical brake action.

27. In an elevator, the combination of a car, means on the car for weighing the car load, a controller machine comprising an electric motor, a screw shaft rotated by the motor, a follower threaded on the screw shaft, an electric circuit for said motor including a contact bar, a series of contacts adjacent said bar, a bridge contact on the follower for engagement with said bar and series of contacts, a selector having a series of contacts corresponding to the first named series of contacts, wires connecting corresponding contacts of the two series, a movable member engaged by the selector contacts having conducting and insulation portions, and means operated by the weighing means for setting the movable member to bring its insulation portion in contact with a selected contact of the selector contacts, thereby to break the motor circuit when the motor has caused a predetermined length of travel of the follower.

28. In an elevator, the combination of a car, means on the car for weighing the car load, a controller machine comprising an electric motor, and an electric circuit for the motor including a selector, and means operated by the weighing means for setting the selector in position for determining the extent of rotation of the motor.

29. In an elevator, the combination of a car, means on the car for weighing the car load, a circuit, a series of resistances, and means for placing any one of said resistances in operation in the circuit including an electric motor, and means actuated by the weighing means for controlling operation of the motor.

30. In an elevator, the combination of a car, an electric motor for causing the car to travel in the elevator hatchway, means on the car for weighing the car load, a series of resistances adapted to be brought in circuit with the motor field winding, and means for selecting any one of said resistances and controlled in response to operation of the weighing means.

31. In an elevator, the combination of a car, an electric motor for causing the car to travel in the elevator hatchway, means on the car for weighing the car load, a series of resistances adapted to be brought in circuit with the motor armature, and means for selecting any one of said resistances and controlled in response to operation of the weighing means.

32. In an elevator, the combination of a car, an electric motor for causing the car to travel in the elevator hatchway, means on the car for weighing the car load, means responsive to the weighing means for regulating the speed of the motor, and means actuated by the weighing means for preventing travel of the car when loaded beyond its normal capacity.

33. In an elevator, the combination of a car, an electric motor for causing the car to travel in the elevator hatchway, means on the car for weighing the car load, a main circuit for the electric motor, a switch in said circuit, means operated by the weighing means for regulating the speed of the motor, and means operated by the weighing means for opening said switch to break said circuit when the car is loaded beyond its normal capacity.

34. In an elevator, the combination of a car, an electric motor for causing the car to travel in the elevator hatchway, means on the car for weighing the car load, a main circuit for the electric motor, and a selector comprising a ring, a rotor, contacts in the circuit and mounted on the ring, means normally closing said contacts, means operated by the weighing means for turning the rotor relatively to the ring, and means on the rotor for opening said contacts to break said circuit when the car is loaded beyond its normal capacity.

35. In an elevator, the combination of a car, an electric motor for causing the car to travel in the elevator hatchway, means on the car for weighing the car load, a main circuit for the motor, means responsive to the weighing means for regulating the speed of the motor, and means operated by the weighing means for breaking said circuit when the car is loaded beyond its normal capacity.

JOSEPH R. JACKSON, Jr.